United States Patent
Hine

[11] Patent Number: 5,831,738
[45] Date of Patent: Nov. 3, 1998

[54] APPARATUS AND METHODS FOR VIEWING IDENTIFICATION MARKS ON SEMICONDUCTOR WAFERS

[75] Inventor: Roger G. Hine, San Francisco, Calif.

[73] Assignee: Hine Design Inc., Redwood City, Calif.

[21] Appl. No.: 179,678

[22] Filed: Jan. 11, 1994

[51] Int. Cl.$^6$ .................................................. G01B 11/00
[52] U.S. Cl. ......................... 356/399; 356/401; 359/390
[58] Field of Search .................................... 356/399, 401; 359/385, 390, 391, 392, 436, 438

[56] References Cited

U.S. PATENT DOCUMENTS

| | | | |
|---|---|---|---|
| 4,232,937 | 11/1980 | Swaminathan et al. | 350/91 |
| 4,241,251 | 12/1980 | Yonekubo | 250/205 |
| 4,449,818 | 5/1984 | Yamaguchi et al. | 356/237 |
| 4,561,731 | 12/1985 | Kley | 350/510 |
| 4,606,616 | 8/1986 | Parker | 350/521 |
| 4,618,938 | 10/1986 | Sandland et al. | 364/552 |
| 4,706,168 | 11/1987 | Weisner | 362/18 |
| 4,734,578 | 3/1988 | Horikawa | 250/234 |
| 4,758,730 | 7/1988 | Bazin et al. | 250/571 |
| 4,972,093 | 11/1990 | Cochran et al. | 250/572 |
| 5,099,354 | 3/1992 | Lichtman et al. | 359/389 |
| 5,231,536 | 7/1993 | Wilt et al. | 359/436 |
| 5,232,536 | 8/1993 | Wilt et al. | 359/436 |
| 5,265,170 | 11/1993 | Hine et al. | |

FOREIGN PATENT DOCUMENTS

A 0 123 128  3/1984  European Pat. Off. .
A 0 240 078  3/1987  European Pat. Off. .

OTHER PUBLICATIONS

Patent Abstracts of Japan, 12, 224, 721 (Abstract of Japanese Patent Application No. 63/018209).
Trade Brochure entitled "XRL ScribeView 2", published by SRL Inc.
Catalog entitled "Precision Optics", published in 1990 by Spindler and Hoyer Inc., pp. G1 and G2.

Primary Examiner—Richard A. Rosenberger
Assistant Examiner—Robert Kim
Attorney, Agent, or Firm—Timothy H. P. Richardson

[57] ABSTRACT

Apparatus and method for reading an identification mark on a semi-conductor wafer. The wafer includes a marking area which bears a relief mark. The marking area is illuminated by a segmented light source and is viewed by a viewing device. The viewing device sees a dark segment and an adjacent lighted segment which preferably surrounds the dark segment, and the mark appears as a light image in the dark segment. Preferably the segmented light source is a diffuse light source with an opaque patch at its center. The method is particularly effective for reading soft marks with low profiles.

27 Claims, 7 Drawing Sheets

FIG. 13
FIG. 14
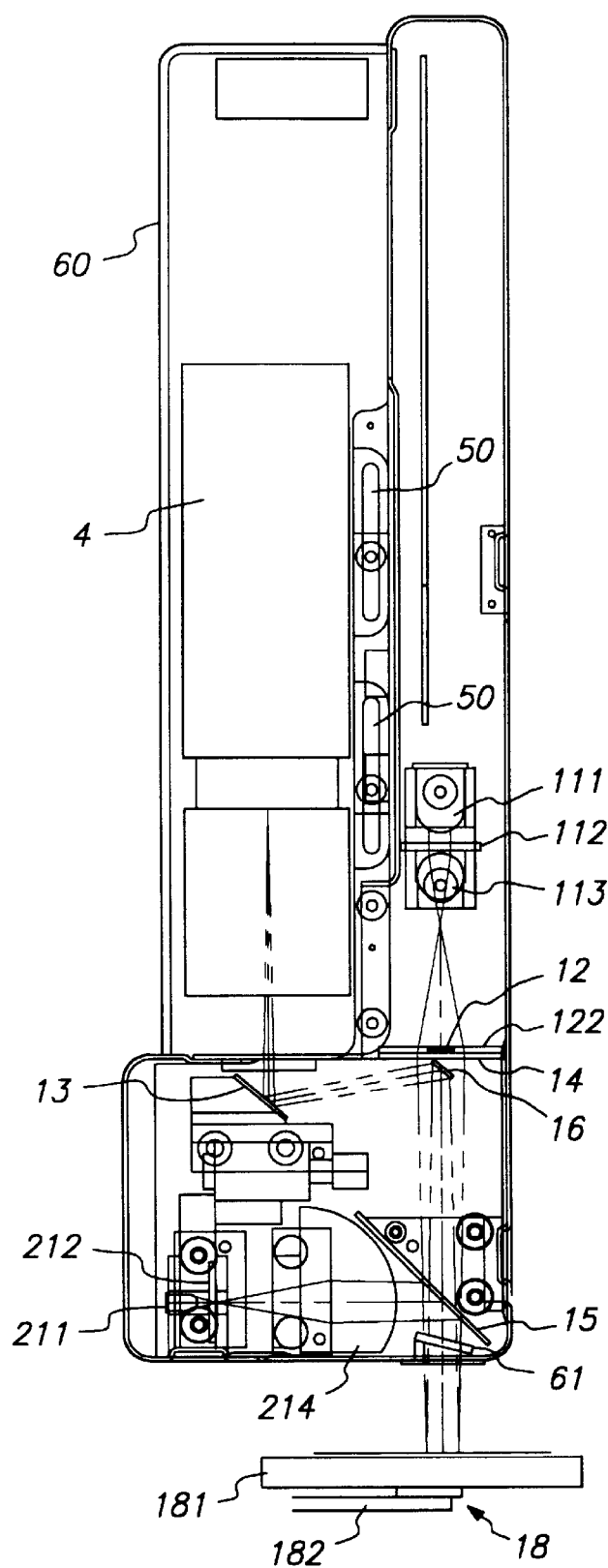
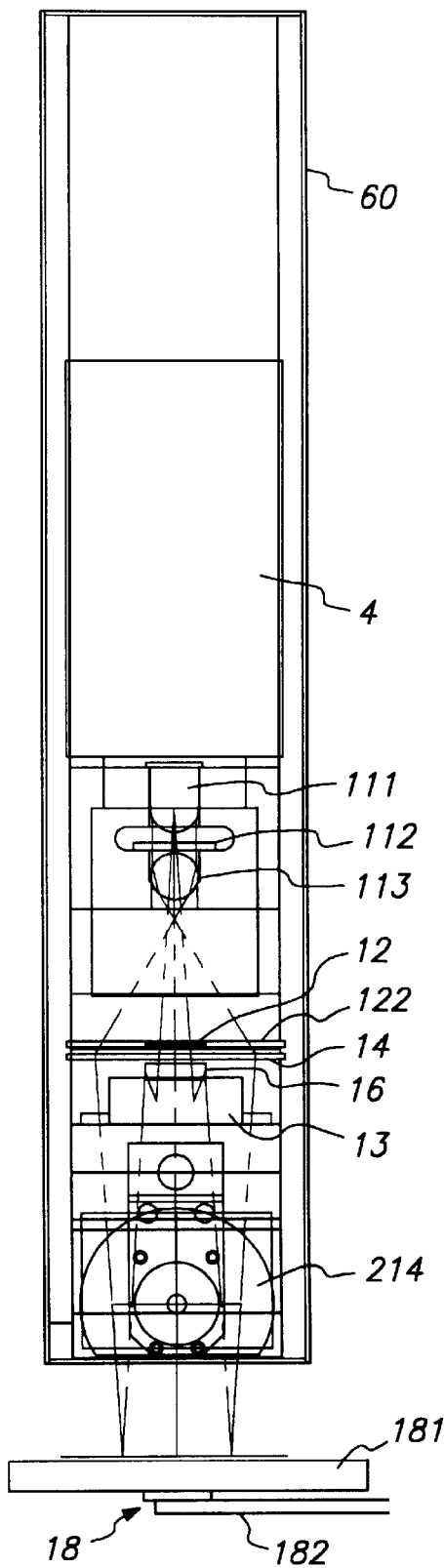

APPARATUS AND METHODS FOR VIEWING IDENTIFICATION MARKS ON SEMICONDUCTOR WAFERS

BACKGROUND OF THE INVENTION

1. Field of the Invention

This invention relates to methods and apparatus for viewing relief areas on specular (i.e. reflective) substrates, particularly for reading identification marks on semiconductor wafers.

2. Introduction to the Invention

It is important to be able to identify semiconductor wafers and the like (e.g. wafers composed of silicon or other semiconductor material such as gallium arsenide) throughout the different treatments which they undergo before being diced into chips. For this purpose, it is conventional for each wafer to carry an identification mark (e.g. an alpha-numeric mark) at a standard location on one of its principal surfaces, usually adjacent a flat, notch or other identifiable discontinuity formed on the periphery of the wafer so that the orientation of the wafer can be easily determined. Many of the treatments undergone by the wafer after it has been marked involve the deposition of metals or chemicals over the mark. The mark must, therefore, be made by a method which deforms the smooth surface of the wafer, e.g. by means of a laser or a diamond stylus, so that the mark will show through such deposited layers. Thus the area including the mark comprises reflective flat surfaces which are parallel to the principal plane of the wafer, and reflective relief surfaces which form the relief mark and which are inclined to the principal plane of the wafer. The relief surfaces can be planar, concave or convex, can be rough or smooth, and can be inclined to the principal plane at angles which vary from very small angles to relatively steep angles up to 90°.

In recent years, it has been realized that it is desirable to make the identification marks on semi-conductor wafers by methods which reduce the deformation of the wafer and the amount of material removed from the wafer. Wafer material removed during the marking process forms debris which must be removed or which, if not removed, may cause problems in subsequent processing or use of the wafer (including chips prepared from it). The formation of debris is a particularly serious problem for chip manufacturers who put their own marks on wafers received from wafer manufacturers. Quite apart from the problems created by debris, the greater the deformation of the chip surface by the mark, the greater the danger that the mark will become contaminated or will act as a stress riser during subsequent processing or use of the wafer. For these reasons, an ever-increasing number of wafers are now marked with so-called "soft" marks, which are extremely shallow and lack well defined edges, and may be created without removing any material at all from the wafer. The relief surfaces may be, for example, shallow dents or craters having rounded contours and a depth of less than 5 microns or even less than 1 micron. The maximum angle at which the relief surfaces are inclined to the plane of the wafer is very small, generally less than 10°, often less than 5°, for example 1 to 3°. Furthermore, the relief surfaces are generally very smooth by comparison with conventional hard marks. Such soft marks are typically made by means of a laser.

It is highly desirable to identify wafers by so-called "machine reading" of the mark, typically with the aid a video camera linked to a television screen. U.S. Pat. No. 5,265,170 (Hine and Krolak, filed Oct. 15, 1990, as a CIP of an application filed Jan. 11, 1990) discloses a particularly valuable machine reading method and apparatus, and in particular discloses the value of apparatus which can be switched between a first mode in which the mark is viewed as a dark image on a light background and a second mode in which the mark is viewed as a light image on a dark background. (Throughout this specification, it is assumed that the images are viewed positively; it is to be understood, however, that the description, and in particular the claims, include the same apparatus and methods when the image is viewed negatively, in which case an image which, if viewed positively, is a light image on a dark background, will be a dark image on a light background, and vice-versa.) Another method is described in U.S. Pat. No. 5,231,536 (Wilt et al, filed May 1, 1992). The disclosures of those two patents are incorporated herein for all purposes.

Known methods for reading identification marks on wafers give adequate, but not entirely satisfactory, results with hard marks, but they are seriously deficient for reading soft marks.

SUMMARY OF THE INVENTION

I have discovered, in accordance with the present invention, a number of improvements in the ways in which identification marks on wafers can be read. These improvements can be used individually or in any combination of two or more of them, or in any combination of one or more of them with other methods or apparatus, including known methods or apparatus, for example as disclosed in more detail below.

Many of the improvements involve viewing an identification mark as a light image on a dark background, the mark being illuminated by a segmented light source which is seen by the viewing device as a light segment and an adjacent relatively dark segment which covers the marking area (i.e. the area defined by the boundaries of the mark). These improvements include:

(A) The size of the light segment is at least a substantial proportion of the size of the dark segment. In one preferred improvement of this kind, (A1), the area of the light segment is at least 0.7 times, preferably at least 0.9 times, particularly at least 1.5 times, the area of the dark segment, and may be several times, e.g. 3 to 10 times, the area of the dark segment; when space permits, the light segment may be even larger, e.g. have an area up to 70 times the area of the dark segment, for example through the use of a light box as the light source. In a second preferred improvement of this kind, (A2), around at least 30%, preferably at least 50%, particularly at least 70%, of the periphery of the dark segment, the width of the light segment is at least 0.8 times, preferably at least 1.1 times, e.g. up to 5 or 10 times, the width of the dark segment. In a third preferred improvement of this kind, (A3), the "radial dimension" of the light segment is greater than the "radial dimension" of the dark segment, preferably at least 1.5 times the "radial dimension" of the dark segment, in at least one plane containing the viewing axis (the term "radial dimension" being used to denote the dimension measured in the plane containing the viewing axis). Usually the radial dimension of the light segment is greater than the radial dimension of the dark segment in planes containing the viewing axis over an angle of at least 60°, preferably over an angle of at least 90° (the planes over an angle of 180° being all the available planes).

(B) The light from the light segment does not vary greatly in intensity, for example has a maximum intensity which is not more than twice, preferably not more than 1.5 times, the minimum intensity, and most preferably is light of substantially uniform intensity.

(C) At least a part, preferably at least 30%, of the periphery of the marking area is separated from the periphery of the dark segment by a relatively small distance, for example by a distance which is not more than 2 times, preferably not more than 1.5 times, particularly not more than 0.9 times, the minimum dimension of the marking area. Preferably this condition is observed over at least 50%, particularly at least 75%, of the periphery of the marking area.

(D) At least a substantial proportion of the light from the light segment which strikes the marking area, for example at least 30%, preferably at least 75%, especially about 100%, of said light, strikes the marking area at an angle such that the angle between the light and the viewing axis between e° and f°, where e is within the range of 0.8° to 3° and f is within the range of 3° to 15°, preferably 3° to 9°, and is at least (e+1)°. The angle e is preferably 1° to 2.1°. The angle f is preferably 3.5° to 8°, , e.g. 3.5° to 6°.

I believe that improvements (A), (B), (C) and (D), individually or in any combination of two or more of them, provide improved results by increasing the amount of light which strikes the inclined relief surfaces of the mark at angles such that the light is reflected into the viewing device. One result of this is that the intensity of the illumination required for good results can be low enough to avoid problems such as glare and heat which are associated with high levels of illumination.

The methods and apparatus of the invention optionally can make use of baffles which prevent all or part of the light segment from being reflected into the viewing device by flat surfaces of the wafer which are outside the dark segment, and/or can make use of a viewing device having a restricted field of view which prevents all or part of the light segment from being reflected into the viewing device by the flat surfaces, and/or can make use of mirrors or lenses which cut off part of the light reflected from the wafer into the viewing device, and/or can position the wafer so that not all of the light source is reflected into the viewing device. If one or more of these conditions is present, this does not substantially change the brightness of the reflected image of the mark, providing that the baffles do not lie in the light paths between the light segment and the marking area. However, in order to determine whether the conditions set out in (A), (B), (C) and (D) are present, the apparatus and/or the wafer should be modified so that the light segment is fully reflected into the viewing device. For this purpose, for example, the wafer may be replaced by a large planar mirror.

The light segment preferably extends completely around the dark segment. However, this is not necessary; for example the dark segment can be in the form of a bar which extends to the edge of the area seen by the viewing device, with the light segment being in the form of two bars, one each side of the dark segment. When reference is made herein to the periphery of the dark segment, this includes any edge of the dark segment which is defined by the aperture of the viewing device. In each of improvements (A), (B), (C) and (D), the light segment preferably extends (continuously or discontinuously) around p% of the perimeter of the dark segment, where p is at least 50, more preferably at least 70, e.g. at least 80, particularly at least 90, more particularly at least 95, especially substantially 100. Where reference is made herein to the area of the light segment and the light segment is in two or more parts, the area in question is the sum of all the parts of the light segment. Similarly, the width or radial dimension of the light segment is the sum of the widths of the parts, or the sum of the radial dimensions of the parts. The widths of the segments are measured along a line at right angles to the principal dimension of the dark segment.

The boundary between the light segment and the dark segment is preferably a sharp one, for example the intensity of the light changing from the average value for the whole of the light area to 0.1 times that average value over a distance of at most 0.3 times, preferably at most 0.2 times, especially at most 0.05 times, the shortest dimension of the marking area. The outer boundary of the light segment, on the other hand, can be blurred.

The width of the light segment is considered in this specification to be the width of the area in which the intensity of the illumination, as viewed from the mark, is at least 0.5 times the maximum intensity of the light segment.

The relatively dark segment is preferably completely dark, i.e. is such that the light entering the viewing device is substantially free from components originating from the dark segment. However, the invention does not exclude a relatively dark segment having a low level of light intensity such that the mark can still be read as a light image on a dark background. The dark segment is preferably provided by a shield which is part of the light source or which lies between a light source and the target area of the wafer, and thus provides a segmented light source of the kind described. The light source may comprise one or more individual light sources, for example a single light emitting diode (LED) or one or more banks of two or more LED's. Preferably the segmented light source comprises a diffuser to render the light more uniform. Particularly preferred is a segmented light source which comprises (1) at least one source of light,
(2) a lens system which magnifies the source of light,
(3) a light diffuser for the light, and
(4) a shield which lies on the diffuser or between the diffuser and the wafer support, and which produces the dark segment.

Another improvement that I have discovered involves viewing an identification mark as a dark image on a light background. This improvement (E) is to illuminate the mark with light in the form of a focused beam whose focus is behind the target area. A focused beam of this kind is a substantial improvement over a divergent or collimated beam as used previously. In particular, the apparent size of the light source is independent of the aperture stop on the camera lens. The location of the focal point of the beam can be controlled by adjusting the distance between the light source and the lens used to focus the beam. This makes it much easier to adjust the apparatus so as to provide an image of maximum size, without having to change the aperture stop of the camera.

In making use of these improvements, the mark can be viewed along an axis at right angles to the principal plane of the wafer, or at any other appropriate angle. Viewing at right angles has the merit of making the apparatus more compact, and avoids the need to realign the camera and the light source if the distance from the marking area to the camera changes. However, it does involve the use of mirrors in improvements (A), (B), (C) and (D), and the use of a beam-splitting device, e.g. a half-silvered mirror or prism, in improvement (E), with consequent losses in the intensity of the image. The viewing axis must be oblique to the wafer if the wafer is being viewed at the bottom of a cassette, as disclosed in U.S. Pat. No. 5,265,170. The viewing axis can of course undergo one or more changes in direction, through the use of lenses, mirrors, half-silvered mirrors and other beam-splitters. Preferably the intensity of the light source(s) can be controlled, for example to avoid glare or otherwise to improve the quality of the image.

My discoveries greatly improve the ease and efficiency with which soft marks can be read, and make it possible for the first time to read soft marks reliably. Often, they also improve the ease and efficiency with which hard marks can be read. However, this is not invariably the case, as for example when the mark comprises relief surfaces which are at a steep angle to the principal plane of the wafer and is viewed as a light image on a dark background.

My discoveries are also applicable to the viewing of other relief surfaces, and to methods of viewing relief surfaces (including identification marks on wafers) in which the light, which is usually visible light, is replaced by another form of radiation.

BRIEF DESCRIPTION OF THE DRAWINGS

The invention is illustrated in the accompanying drawings, in which

FIGS. 13 and 14 are side and front views of apparatus integrating the apparatus of FIGS. 3–4 and 11–12.

DETAILED DESCRIPTION OF THE INVENTION

Figure 1:
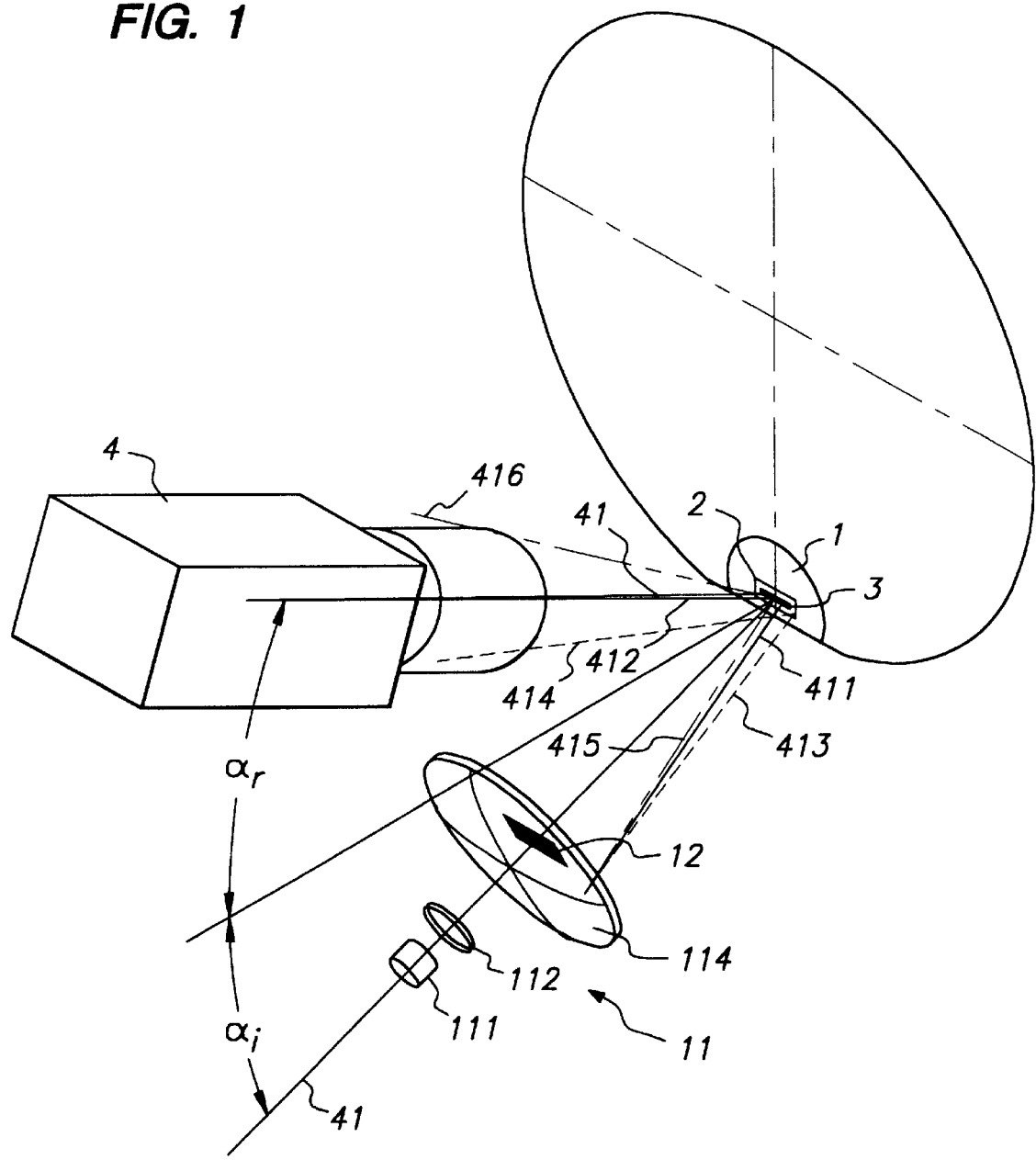
FIG. 1 is a diagrammatic isometric view of a method of the invention in which the mark is viewed as a light image on a dark background and the viewing axis is inclined to the principal plane of the wafer.

When the apparatus is in use, it includes a viewing device, typically a video camera linked to a television screen so that the operator can read the image of the mark. However, the invention includes apparatus which does not include a viewing device but does have a location in which a viewing device can be placed, for example a camera support, which may be adjustable. If the apparatus does include a camera or other viewing device, it may or may not include a television screen or other display device to display the mark.

When the apparatus is in use, the wafer is supported by means of a wafer support. The wafer support can be an integral part of the apparatus. Usually, however, the apparatus is preassembled with all the necessary parts except the wafer support, and is then positioned adjacent to separate apparatus comprising a wafer support which can move a wafer into, and out of, the wafer location. The wafer support can for example comprise a vacuum chuck or a platform with a polymeric surface, and can be mounted on an articulated arm (or so-called "end effecter") for example as discussed in U.S. Pat. No. 4,749,330 (Hine), the disclosure of which is incorporated herein by reference.

When the method or apparatus of the invention makes use of one of the improvements of the invention in which the mark is viewed as a light image on a dark background, it can be used in conjunction with apparatus which enables the mark to be read as a dark image against a light background, especially one which makes use of improvement (E) of the present invention. Preferably the apparatus is such that the mark can be viewed as a light image or as a dark image without moving the wafer. Preferably the apparatus can be operated in one mode or the other merely by operating a switch. The switch can be operated by an operator, or can be linked to an optical character reader (OCR) which operates the switch to change from one mode to the other when the image cannot be read with a predetermined degree of confidence.

Similarly, when the method or apparatus of the invention makes use of improvement (E) of the invention, it can be used in conjunction with apparatus which enables the mark to be read as a light image against a dark background, especially one which makes use of one or more of improvements (A), (B), (C) or (D) of the present invention.

In making use of improvements (A), (B), (C) and (D) of this invention, it is usually convenient for the dark segment to be of the same general shape as the marking area of the wafer. Thus if the mark defines a rectangular marking area, the dark segment is usually also rectangular. However, if only part of the mark is to be viewed (for example if the characters of the mark are read sequentially while traversing the mark across the camera's field of view), then better results can often be obtained by using a dark segment which corresponds only to the part of the mark being read, e.g. a square or a circle. The best image of the mark is obtained when the dark segment covers substantially only the area of the mark which is to be viewed. However, especially when the wafer is supported in the wafer location by a wafer support which is not integrated with the light source, and/or when the precise location of the mark on the wafer may vary, it is preferable to allow a margin for error, and thus to avoid or minimize the need to adjust the relative positions of the wafer and viewing device and/or light source. Improvement (C) of the invention provides a precise definition of the preferred ranges which compromise between the optimum image and the practical need for apparatus which does not need constant adjustment. Preferably the apparatus is arranged so that a patch of one size or shape can readily be replaced by a different patch. In this way, the operator can change the patch to give the best results with a particular type of wafer. Thus the apparatus preferably includes an accessible patch location into which a patch can readily be placed or from which a patch can readily be removed.

As briefly noted above, the marking area on a wafer is usually rectangular. If the two long sides of the marking area are separated by a distance p and the two short sides by a distance q, the dark segment preferably also has a substantially rectangular shape having two long sides separated by a distance d which is 1.5 p to 3.0 p, preferably 1.8 p to 2.5 p, and two short sides separated by a distance b which is at least q+0.5 p.

The light segment illuminates the mark with light which strikes the marking area over a range of angles, the bottom limit of the range being determined by the periphery of the dark segment and being inclined to the viewing axis at only a small angle, and the top end of the range being determined by the outer periphery of the light segment. The image of the mark is formed by light reflected from relief surfaces of the mark which lie within a corresponding range of angles which differ from the principal plane of the wafer by a similar amount. The more uniform the light within that range, and the better the correspondence between at least part of that range and the inclination of the relief surfaces of the mark, the easier the image will be read. Earlier methods of reading marks as light images on dark backgrounds do not employ light which strikes the wafer at the angles which result in reflection from the very shallow and smooth surfaces which are characteristic of soft marks. Improvements (A), (B) and (D) provide different but related ways of defining the light source as one which provides a good image of a soft mark (and, in many cases, of hard marks as well, providing that they include surfaces at the appropriate angles). In the definition of improvement (D), the angle of the light from any point on the lighted segment is defined herein as the angle between (a) the viewing axis, and (b) a line which joins that point to the intersection of the viewing axis and the marking area. However, it should be noted that light from each point of the light segment will strike each point on the marking area, which is why the best results are obtained with a substantially uniform light segment, preferably produced with the aid of a diffuser.

Figure 2:
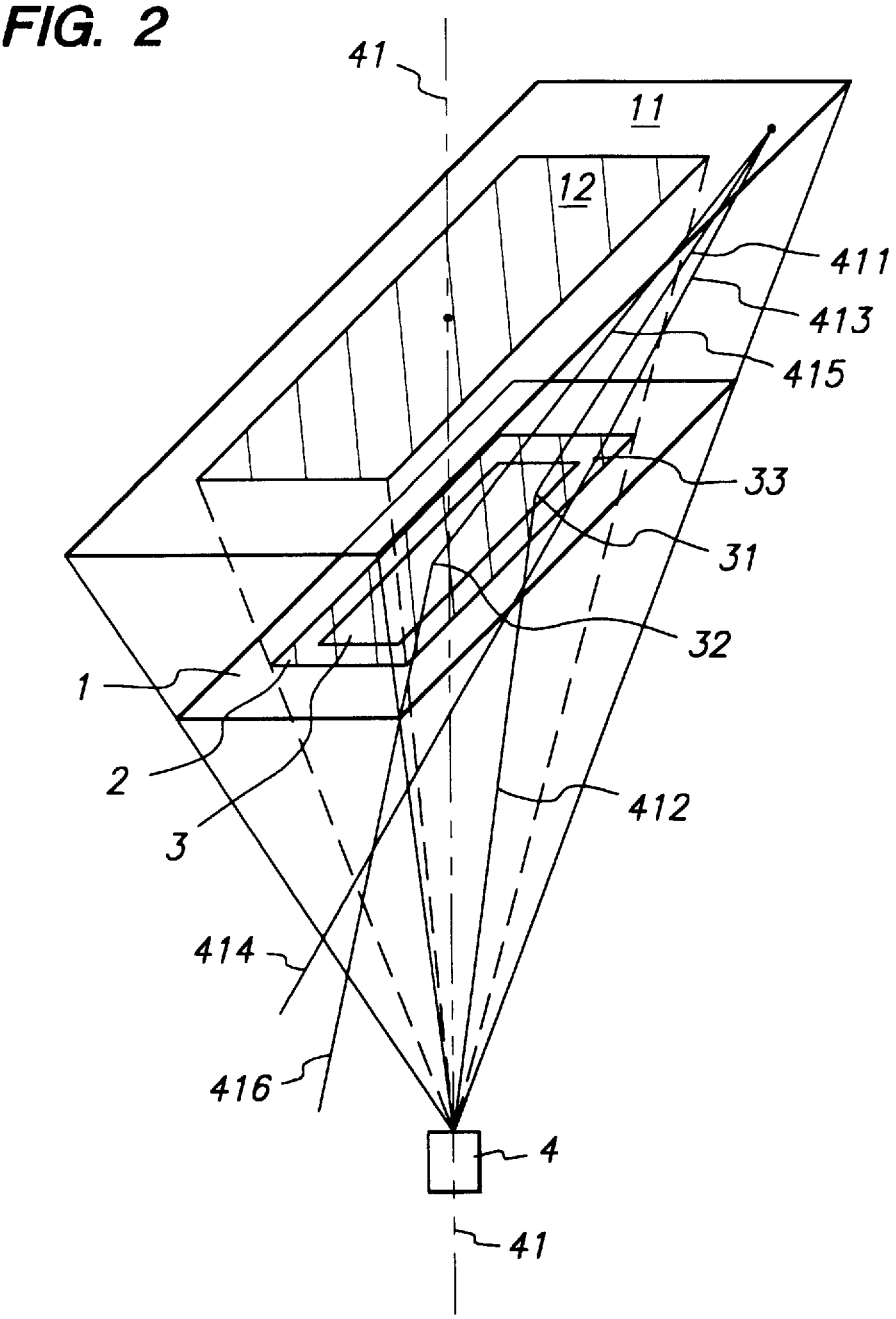
FIG. 2 is a diagrammatic isometric view of a method of the invention in which the mark is viewed as a light image on a dark background, and the viewing axis is normal to the plane of the wafer.

FIGS. 1 and 2 are diagrammatic isometric views of the methods of the invention for viewing a mark on a wafer as a light image on a dark background. In the interests of clarity, FIG. 2 makes use of the convention that light reflected from a mirror is shown as passing through the mirror. In FIGS. 2, the view is foreshortened considerably, so that the angles to the viewing axis are much larger than in actual practice (as will be seen in the later Figures). In FIGS. 1 and 2, a viewing device 4 views the surface of a semi-conductor wafer which contains areas 1, 2 and 3. The viewing axis 41 is at an angle αi to the normal to the plane of the wafer in FIG. 1, and normal to it in FIG. 2. The device sees a segmented light source consisting of a dark segment 2 surrounded by a lighted segment 1. The lighted segment 1 corresponds to a light source 11 and the dark segment corresponds to a dark patch 12 between the light source and the wafer. As shown in FIG. 1, the light source 11 comprises an LED 111, a diffuser 112, and a magnifying lens 114 on which the patch is placed. Within the dark segment 2 is a marking area 3 containing relief surfaces, some of which reflect light into the viewing device to form an image of the mark (not shown). Light from the light source strikes all points on the surfaces 1, 2 and 3. Light rays 111, 113 and 115 are representative rays. Ray 111 strikes a relief surface at point 31 which is inclined to the planar surface at an angle such that ray 112 is reflected into the viewing device. Ray 115 strikes a relief surface at point 32 which is inclined to the planar surface at an angle such that reflected ray 116 does not enter the viewing device. Ray 113 strikes a coplanar surface and is reflected as ray 114 which does not enter the viewing device.

Figure 3:
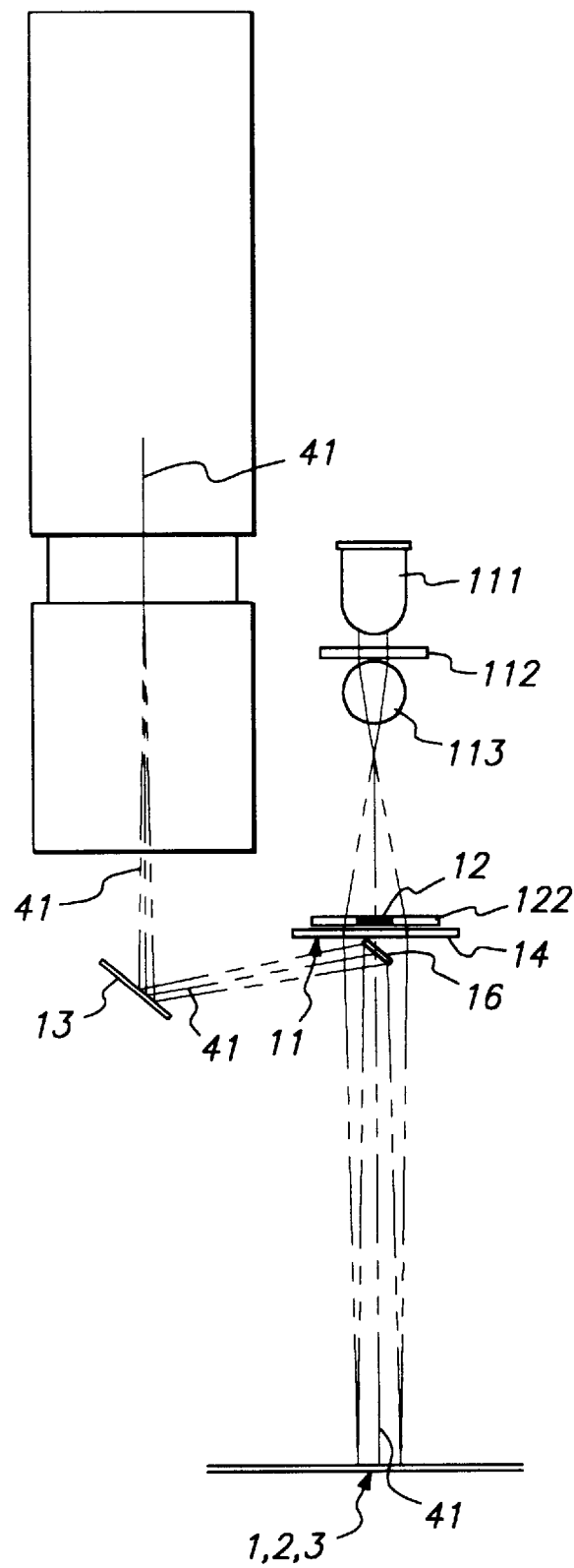
FIGS. 3 and 4 are side and front views of apparatus of the invention which views the mark as a light image.
Figure 4:
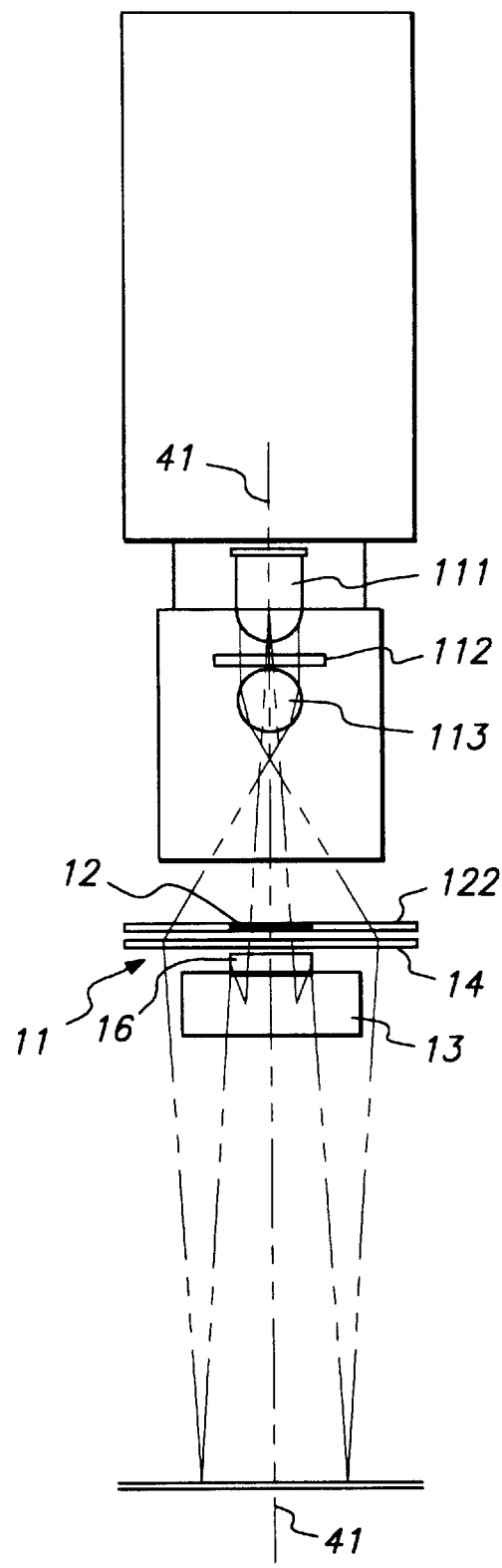
Figure 5:
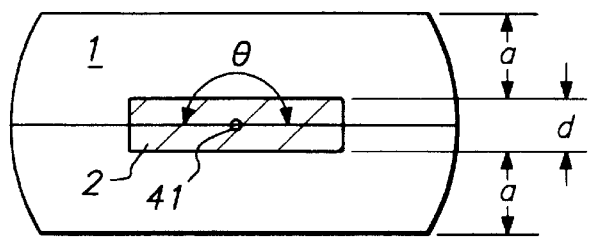
FIGS. 5–9 show possible arrangements of the dark and light segments.

FIGS. 3 and 4 show side and front views of an apparatus which makes use of the principles explained in connection with FIGS. 1 and 2. Between the opaque patch 12 and the wafer is a mirror 16 which reflects light reflected into it from areas 1, 2 and 3 onto a second mirror 13 and thence into the viewing device 4. The light source comprises an LED 111 (e.g. a 15 candela LED), a diffuser 112, a reducing lens 113, a magnifying Fresnel lens 114, and the opaque patch 12. The opaque patch 12 is in the form of a patch which is supported by, e.g. has been silkscreened onto, a piece of clear plastic 122. The piece of plastic can easily be replaced by another piece of plastic having a different opaque patch thereon.

Figure 6:
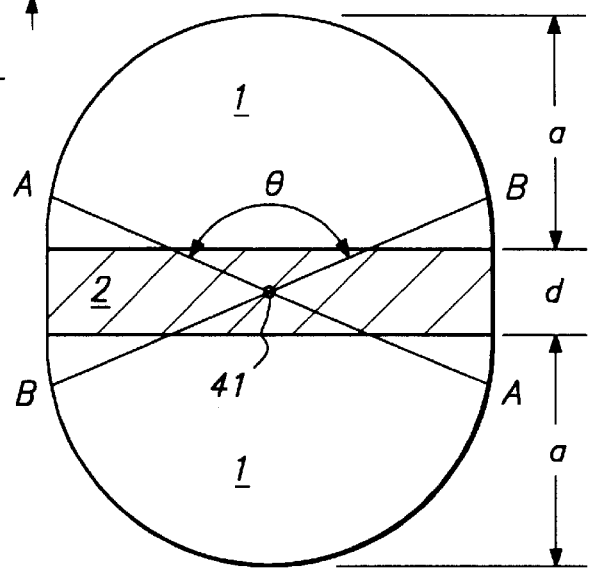
Figure 7:
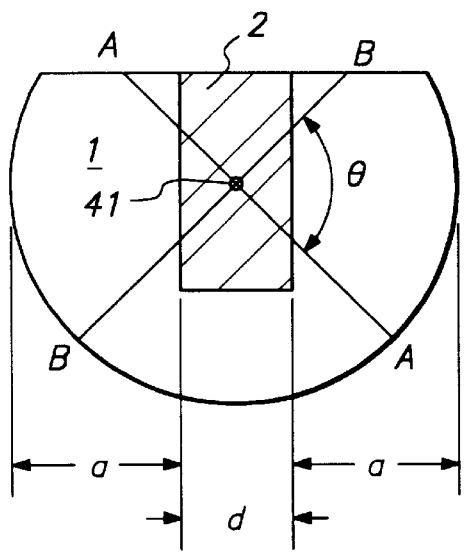
Figure 8:
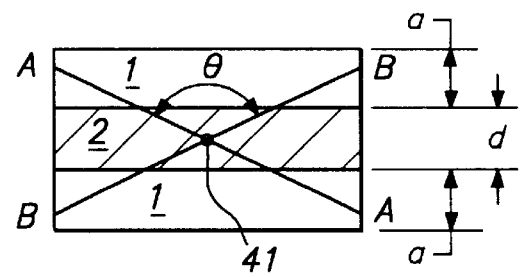

FIGS. 5, 6, 7 and 8 show possible arrangements of a dark segment 2 which is partially or completely surrounded by a light segment 1 which may be in one part (FIGS. 5 and 7) or in two parts (FIGS. 6 and 8). In FIGS. 5–8, the angle θ is the angle over which the radial dimension of the light segment is greater than the radial dimension of the dark segment in the planes containing the viewing axis, the limiting planes being designated A—A and B—B in FIGS. 6–8, and there being no limiting planes in FIG. 5 since all the planes meet this condition. In each of FIGS. 5–8, the area of the light segment is at least about 2 times the area of the dark segment, and the light extends continuously (FIG. 5) or discontinuously (FIGS. 6, 7 and 8) around at least 80% of the periphery of the dark segment. In each of FIGS. 5–8, the dark segment has a substantially rectangular shape with two long sides separated by a distance d, and in the plane which contains the viewing axis and is at right angles to the long s sides of the dark segment, the light segment is in two parts, each part having a width a, and the width of light segment (2a) is at least 1.5 d.

Figure 9:
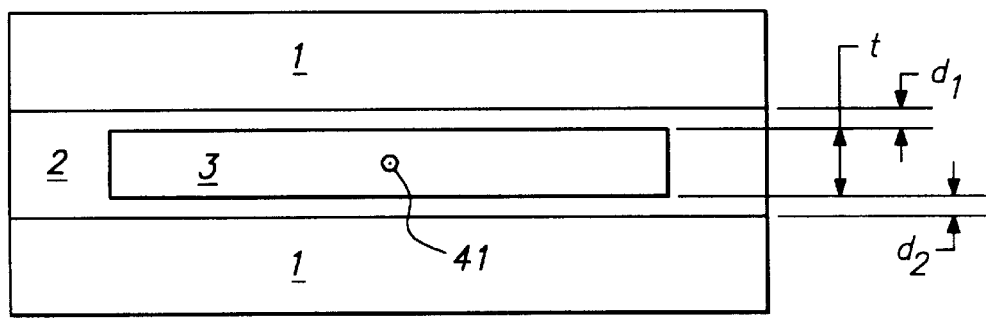

FIG. 9 is similar to FIG. 8 but also shows marking area 3, which is closer to one of the two parts of the light segment than it is to the other part. Along one long edge of the marking area, it is separated from the periphery of the dark segment by a distance $d_1$, and along the other long edge of the marking area, it is separated from the periphery of the dark segment by a distance $d_2$, and each of $d_1$ and $d_2$ is not more than 0.9 times the minimum dimension of the marking area (t).

Figure 10:
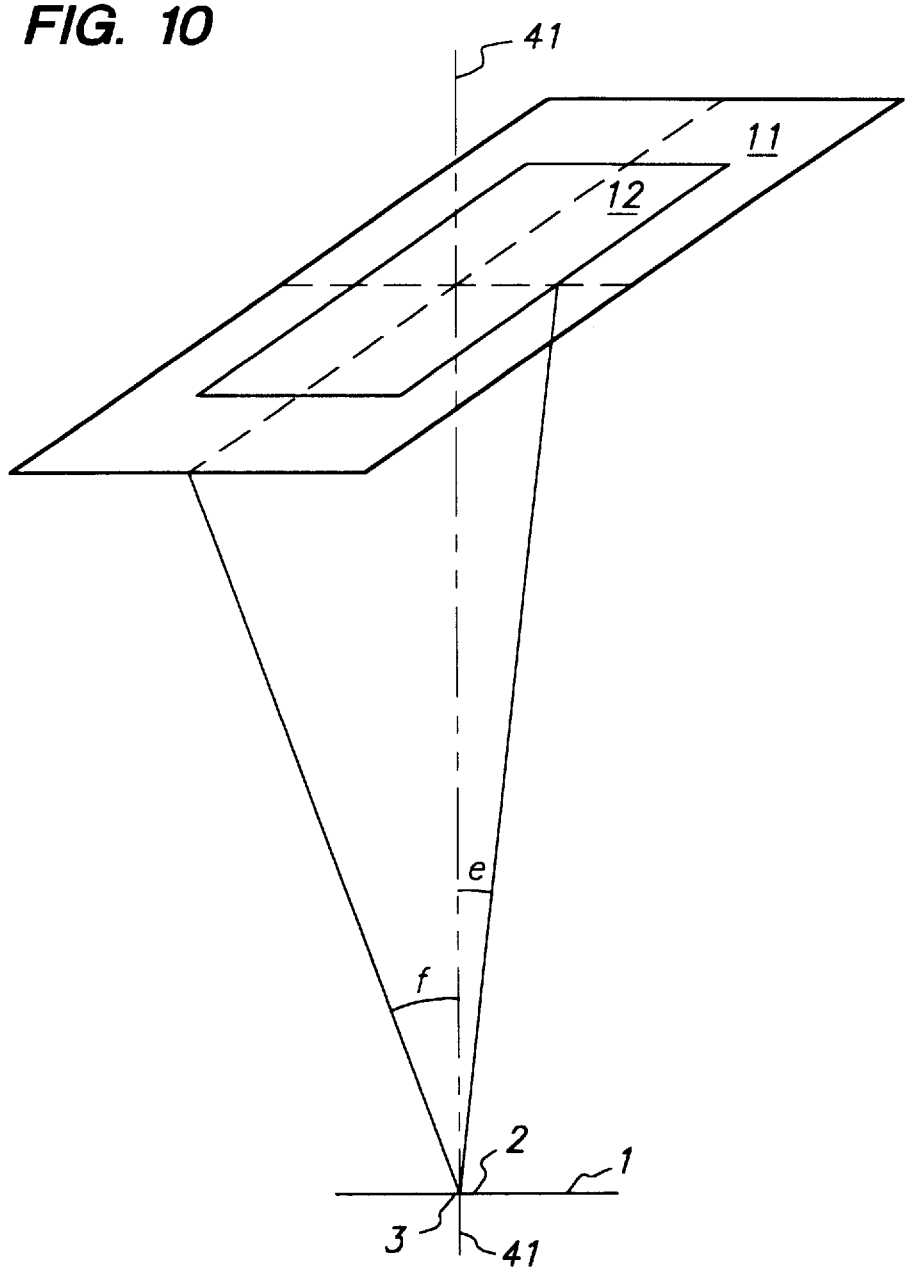
FIG. 10 shows how the angles e and f in improvement (D) are measured.

FIG. 10 illustrates how the angles e and f in improvement (D) are measured. Thus the minimum angle e is defined by the points on the light segment closest to the viewing axis, while the maximum angle f is defined by the points on the light segment furthest from the viewing axis.

Figure 11:
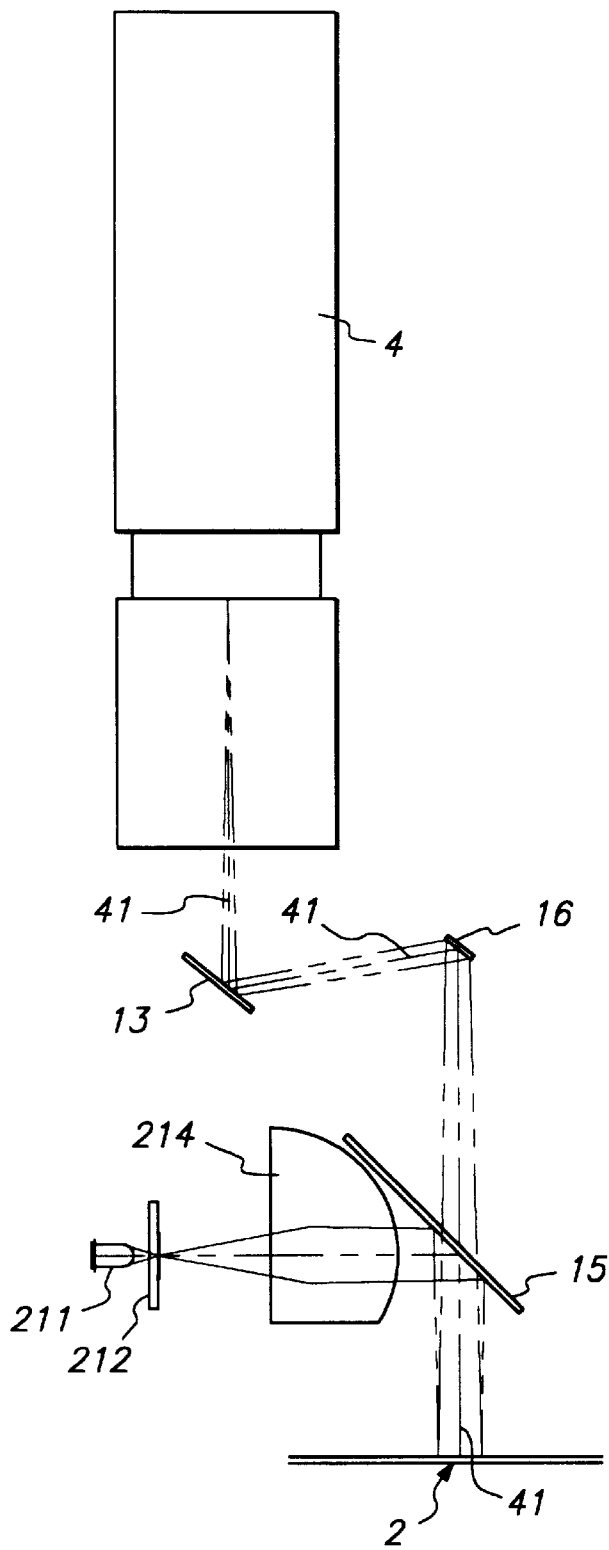
FIGS. 11 and 12 are side and front views of apparatus of the invention which views the mark as a dark image.
Figure 12:
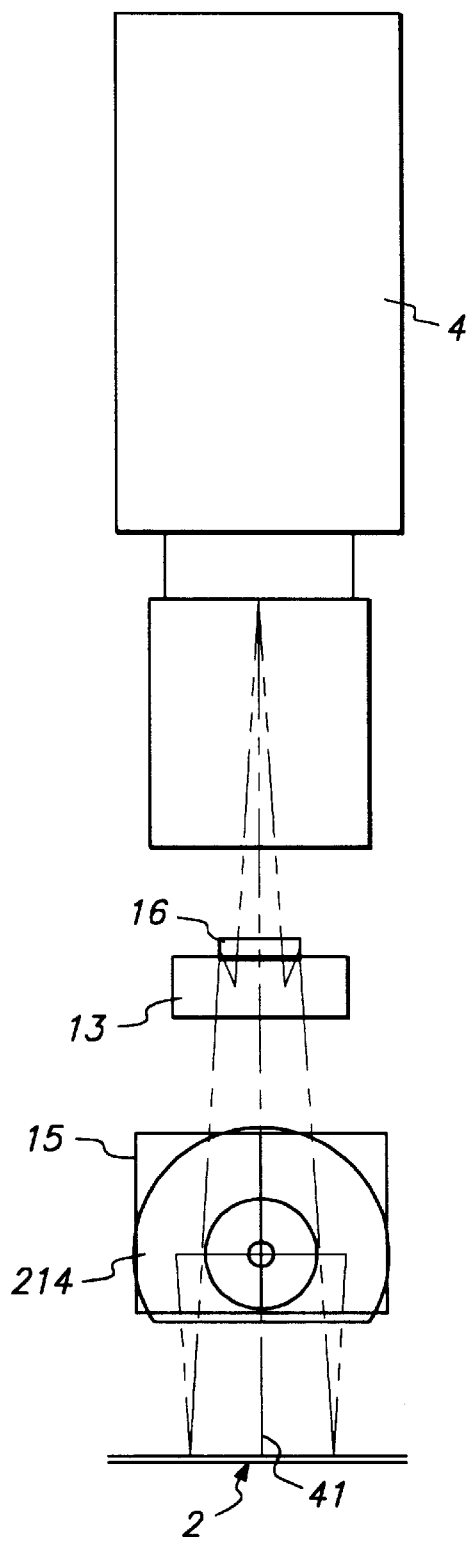

FIGS. 11 and 12 show side and front views of an apparatus which makes use of improvement (E) of the invention. The viewing device 4 views the marking area 2 of a wafer which is illuminated by light in the form of a beam focused behind the plane of the wafer. The light is supplied by a combination of an LED 211, a pinhole aperture over a diffuser 212, and a lens 214, and is directed along a viewing axis 41 by a half-silvered mirror 15. The reflected light passes through the half-silvered mirror to mirrors 16 and 13 which reflect the light into a camera 4.

FIGS. 13 and 14 show an apparatus which combines the apparatus of FIGS. 3, 4 and apparatus of FIGS. 11, 12, and shows some additional features, including a wafer support 18 comprising a platform 181 for the wafer and an articulated arm 182, location slides 50 for the camera, and other adjustment means for the light source and other parts of the apparatus. The apparatus includes a housing 60, having a window 61 through which a wafer can be viewed. The window is preferably angled so as to reduce or eliminate glare.

What is claimed is:

1. Apparatus for viewing a relief mark on a semi-conductor wafer having a principal plane, the relief mark forming part of a target area comprising
   (a) reflective flat surfaces which are parallel to the principal plane, and
   (b) reflective relief surfaces which form the relief mark and which are inclined to the principal plane, the boundaries of the relief surfaces defining a marking area, said apparatus comprising
   (1) a wafer location in which a said wafer can be supported with the target area in a viewing position;
   (2) a segmented light source for illuminating the target area of said wafer; and
   (3) a device location in which a viewing device can be placed for viewing the target area of a said wafer with its target area in the viewing position;

the apparatus being such that, when
(i) the segmented light source is on,
(ii) a said wafer is supported in the wafer location with its target area in the viewing position,
(iii) a viewing device is placed in the device location and is viewing the target area along a viewing axis, and
(iv) any part of the apparatus or wafer which is shaped so that the viewing device does not see all the light reflected from areas adjacent to the target area has been modified so that the light segment is fully reflected into the viewing device, the viewing device
(a) views the target area and the segmented light source along a viewing axis and sees the segmented light source as (a) a relatively dark segment which covers the mark and (b) an adjacent light segment, and
(b) views the mark as a light image on a dark background, the image being formed by light which has been reflected from relief surfaces of the mark;

said apparatus having at least one of the following characteristics:
(A1) the area of the light segment is at least 0.7 times the area of the dark segment;
(A2) around at least 30% of the periphery of the dark segment, the width of the light segment is at least 0.8 times the width of the dark segment;
(A3) the radial dimension of the light segment is greater than the radial dimension of the dark segment in at least one plane containing the viewing axis;
(B) the light from the light segment has a maximum intensity and a minimum intensity, and the maximum intensity is not more than twice the minimum intensity;
(C) at least 30% of the periphery of the marking area is separated from the periphery of the dark segment by a distance which is not more than 2 times the minimum dimension of the marking area; and
(D) at least 30% of the light from the light segment which strikes the marking area is light which is at an angle of e° to f° to a perpendicular to the principal plane of the wafer, where e is within the range 0.8° to 3°, and f is within the range 3° to 9° and is at least (e+1)°.

2. Apparatus according to claim 1 which has at least one of characteristics (A1), (A2) and (A3).

3. Apparatus according to claim 2 wherein the relief mark has boundaries which define a substantially rectangular marking area having two long sides separated by a distance p and two short sides separated by a distance q, and the dark segment has a substantially rectangular shape having two long sides separated by a distance of 1.5 p to 3.0 p and two short sides separated by a distance of least q+0.5 p.

4. Apparatus according to claim 2 wherein (i) the dark segment has a substantially rectangular shape having two long sides separated by a distance d, (ii) the light segment comprises a first part adjacent one long side of the dark segment and a second part adjacent the other long side of the dark segment, and (iii) in the plane containing the viewing axis which is at right angles to the long sides of the dark segment, the width of the first part is a and the width of the second part is b, and the width of the light segment, a+b, is at least 1.5 d.

5. Apparatus according to claim 2 wherein the dark segment is substantially rectangular, the light segment has a substantially circular periphery, and the rectangular dark segment and the light segment have a common center.

6. Apparatus according to claim 2 wherein the radial dimension of the dark segment is less than the radial dimension of the light segment in planes containing the viewing axis over an angle of at least 90°.

7. Apparatus according to claim 2 wherein the light segment extends completely around the dark segment and around at least 80% of the periphery of the dark segment, the width of the light segment is at least 1.1 times the width of the dark segment.

8. Apparatus according to claim 2 wherein the area of the light segment is at least 1.5 times the area of the dark segment.

9. Apparatus according to claim 2 wherein the maximum intensity of the light in the light segment is not more than twice the minimum intensity of the light in the light segment.

10. Apparatus according to claim 2 wherein the maximum intensity of the light in the light segment is not more than 1.5 times the minimum intensity of the light in the light segment.

11. Apparatus according to claim 2 which comprises a light diffuser such that the intensity of the light is substantially uniform over the light segment.

12. Apparatus according to claim 11 wherein the segmented light source comprises
(1) at least one source of light,
(2) a lens system which magnifies the source of light,
(3) a light diffuser for the light, and
(4) a shield which lies on the diffuser or between the diffuser and the wafer support area, and which produces the dark segment.

13. Apparatus according to claim 12 wherein the viewing axis, as it reaches a wafer supported in the wafer location with its target area in the viewing position, is at right angles to the principal plane of the wafer, and wherein the apparatus further comprises a mirror which (i) is placed between the shield and the wafer, and (ii) is angled so that it reflects towards the viewing device light from the light segment which is reflected from the target area.

14. Apparatus according to claim 2 which comprises a viewing device in the device location.

15. Apparatus according to claim 14 which comprises a wafer support for supporting said wafer in the wafer location.

16. Apparatus according to claim 1 which further comprises a lightfield light source which, when
(i) a said wafer is supported in the wafer location with its target area in the viewing position,
(ii) a viewing device is placed in the device location and is viewing the target area along a viewing axis,
(iii) the lightfield light source is on, and
(iv) the segmented light source is off,
illuminates the target area with light which is reflected into the viewing device by surfaces of the target area which are parallel to the principal plane of the wafer but which is not reflected into the viewing device by the inclined surfaces of the mark, whereby the viewing device views the mark as a dark image on a light background.

17. Apparatus according to claim 16 wherein the light from the lightfield light source is in the form of a focused beam whose focus is behind the target area.

18. Apparatus according to claim 17 wherein the axis of the focused beam is at right angles to the principal plane of the wafer, and the light from the lightfield light source passes through a beam splitter which reflects into the viewing device light reflected from the target area.

19. Apparatus according to claim 16 which further comprises a switch which turns on either the segmented light source or the lightfield light source.

20. Apparatus according to claim 1 which has characteristic (B) and in which the light from the light segment has a substantially uniform intensity.

21. Apparatus according to claim 1 which has characteristic (C) and wherein
   (a) the marking area is substantially rectangular and has two long edges separated by a distance p and two short edges separated by a distance q, and
   (b) the dark segment is substantially rectangular and has two long sides separated by a distance of 1.25 p to 3.0 p and two short sides separated by a distance of at least q+0.5 p.

22. Apparatus according to claim 1 which has characteristic (D) and in which at least 50% of the light from the light segment which strikes the marking area strikes at an angle of e° to f°, where e is in the range 1 to 2.1° and f is in the range 3.5° to 6°.

23. Apparatus for viewing a relief mark on a semiconductor wafer having a principal plane, the relief mark forming part of a target area comprising
   (a) reflective flat surfaces which are parallel to the principal plane, and
   (b) reflective relief surfaces which form the relief mark and which are inclined to the principal plane, said apparatus comprising
   (1) a wafer location in which a said wafer can be supported with the target area in a viewing position; and
   (2) a lightfield light source which, when
      (i) the lightfield light source is on, and
      (ii) a said wafer is supported in the wafer location with its target area in the viewing position,
   illuminates the target area with light in the form of a focused beam whose focus is behind the target area.

24. Apparatus according to claim 23 which further comprises a viewing device, and a darkfield light source which, when
   (i) a said wafer is supported in the wafer location,
   (ii) the lightfield light source is off, and
   (iii) the darkfield light source is on,
illuminates the target area with light which is reflected into the viewing device from relief surfaces of the target area but not from coplanar surfaces of the target area, whereby the viewing device views the mark as a light image on a dark background.

25. A method of viewing a relief mark on a semiconductor wafer having a principal plane, the relief mark forming part of a target area comprising
   (a) reflective flat surfaces which are parallel to the principal plane, and
   (b) reflective relief surfaces which form the relief mark and which are inclined to the principal plane,
said method comprising
   (A) illuminating the target area by a segmented light source; and
   (B) viewing the target area along a viewing axis such that the mark is viewed as a light image, formed from light from the segmented light source which has been reflected by relief surfaces of the mark, against a dark background;
the segmented light source being such that, providing nothing prevents the whole of the light segment from being reflected into the viewing device, the segmented light source appears, when the target area is being viewed along the viewing axis, as (a) a relatively dark segment which covers the mark, and (b) an adjacent light segment;
said method having at least one of the following characteristics:
   (A1) the area of the light segment is at least 0.7 times the area of the dark segment;
   (A2) around at least 30% of the periphery of the dark segment, the width of the light segment is at least 0.8 times the width of the dark segment;
   (A3) the radial dimension of the light segment is greater than the radial dimension of the dark segment in at least one plane containing the viewing axis;
   (B) the light from the light segment has a maximum intensity and a minimum intensity, and the maximum intensity is not more than twice the minimum intensity;
   (C) at least 30% of the periphery of the mnarking area is separated from the periphery of the dark segment by a distance which is not more than 2 times the minimum dimension of the marking area; and
   (D) at least 30% of the light from the light segment which strikes the marking area is light which is at an angle of e° to f° to a perpendicular to the principal plane of the wafer, where e is within the range 0.8° to 3°, and f is within the range 3° to 9° and is at least (e+1)°.

26. A method according to claim 25 wherein the mark is a soft mark.

27. A method of viewing a relief mark on a semiconductor wafer having a principal plane, the relief mark forming part of a target area comprising
   (a) reflective flat surfaces which are parallel to the principal plane, and
   (b) reflective relief surfaces which form the relief mark and which are inclined to the principal plane,
said method comprising
   (A) illuminating the target area with light in the form of a focused beam whose focus is behind the target area; and
   (B) viewing the target area along a viewing axis such that the target area is viewed as an image formed by light reflected from the flat surfaces of the target area, whereby the mark is viewed as a dark image on a light background.

* * * * *